Patented Feb. 6, 1951

UNITED STATES PATENT OFFICE 2,540,592

PLASTICIZED PHENOLIC RESIN BLENDS

Raymond G. Newberg, Cranford, and David W. Young, Roselle, N. J., assignors to Standard Oil Development Company, a corporation of Delaware No Drawing. Application September 10, 1948, Serial No. 48,752

8 Claims. (Cl. 260—17.2)

This application is a continuation-in-part of a copending application Serial No. 45,208, filed August 19, 1948.

This invention relates to three-component resinous blends containing a resin such as a phenol-formaldehyde condensation product, a diene-nitrile elastomer and a tough polymeric hydrocarbon plasticizer.

Objects of the invention include the formulation of easily processable resinous compounds having improved impact strength and other desirable properties. More specific objects will become apparent from the subsequent description.

While it has been known that phenolic resins could be blended with various plasticizers and/or fillers to reduce their brittleness and improve other physical or chemical properties, it has now been discovered that unexpectedly advantageous leathery or semi-rigid, resilient thermosetting phenolic resin compounds of improved processing, molding, tear resistance and aging characteristics can be prepared by blending phenolic resins with a diene-nitrile elastomer and a tough, flexible, thermoplastic, essentially saturated hydrocarbon copolymer of the styrene type.

The three principal materials used in the present invention are:

I. Thermosetting aldehyde-condensation resinoids obtained by condensing about 0.75 to 1.5 mols of an aliphatic or aromatic aldehyde of up to about 7 carbon atoms such as formaldehyde, acetaldehyde, furfural or the like with 1 mol of a phenol, such as phenol proper or a hydrocarbon derivative thereof having up to about 25 carbon atoms per substituent, such as cresol, isobutyl phenol, diisobutyl phenol, octadecyl phenol, mixed petroleum phenols, or phenols containing a monoolefinic or diolefinic hydrocarbon substituent, such phenols being represented by cardanol, anacardic acid, cashew nut shell extracts or distillates, phenols alkylated with polypropylene, and other phenols known to the art. The meta- or para-substituted phenols are preferred. Alternatively instead of using a phenol, urea or thiourea can be condensed with an aldehyde for the purposes of the present invention.

The phenol-aldehyde condensation reaction is carried out in the usual well-known manner, at temperatures ranging from 60° C. to 150° C., the heating being preferably accomplished by a steam jacket maintained at about 100° C. to 120° C.; the usual basic or acid catalysts are used in the reaction, ammonia, pyridine, piperidine and alkali hydroxide being the most common catalysts of the basic type which lead to the formation of the so-called resoles and B-stage resins, while sulfuric and hydrochloric acid are representative of the acid catalysts which are used in the formation of the so-called novolacs, which for most purposes are equivalent to the aforementioned alkali catalyzed resins. The condensation reaction is capable of control by adjustment of pH value and condensation temperature. A suitable manufacturing procedure is described, for example, in "Plastics, Scientific and Technological," by H. R. Fleck, pp. 87–91 (Chemical Publishing Co., 1945). Free aldehyde or particularly about 2 to 10 percent of hexamethylene tetramine may be advantageously present in or added to the thermosetting resin prior to final compounding and curing in order to make it more reactive and faster curing.

II. The second principal ingredient used in the blends of the present invention is preferably an elastomer prepared by copolymerizing 20 to 40 parts of an acrylic nitrile such as acrylonitrile, $\alpha$-methacrylonitrile, $\alpha$-ethacrylonitrile or $\alpha$-chloracrylonitrile, with 80 to 60 parts of a conjugated diolefin of 4 to 6 carbon atoms such as butadiene-1,3, isoprene or dimethyl butadiene. As is well known, in preparing these elastomers one volume of the preferred monomers such as butadiene and acrylonitrile is emulsified in one-half to ten volumes, preferably in two to four volumes of water or other aqueous medium with the help of an emulsifier such as sodium oleate or other alkali soap of a higher fatty acid, or with the help of synthetic dispersing agents of the sulfonate type, and the emulsion is thereafter polymerized at temperatures between about 10 and 65° C. in the presence of about 0.2 to 5 weight percent (based on monomers) of an oxygen-yielding catalyst such as hydrogen peroxide, benzoyl peroxide, potassium persulfate or other alkali metal persulfates or perborates or mixtures thereof. Usually, it is also desirable to add to the polymerizable mixture about 0.3 to 4 weight percent of a polymerization modifier, e. g., a mercaptan of 6 to 18 carbon atoms such as lauryl mercaptan, or a commercial mixture of mercaptans known as "Lorol" mercaptan which consists predominantly of lauryl mercaptan with minor amounts of other mercaptans in the $C_6$ to $C_{18}$ range. The polymerization is normally continued until about 70 to 95 percent of the monomers are converted to form the desired copolymers, which usually have a Mooney viscosity of 60 to 100 as determined by the use of a large rotor (2 minutes at 100° C.). For the sake of brevity, these known rubbery copolymers will hereinafter be referred to simply as diene-nitrile elastomers. However, instead of the rubbery copolymers just described for certain purposes it is also possible to use oily copolymers of the diolefin-nitrile type such as can be obtained by using a relatively large amount, e. g., 2 to 8 percent, of mercaptan modifier in the polymerizable charge.

III. The third essential ingredient used in the blends of the present invention is a tough, thermoplastic copolymer of an isoolefin such as isoamylene or preferably isobutylene with a styrene such as α-methyl styrene, p-methyl styrene or preferably with styrene proper. These polymers are prepared by polymerizing a mixture of 40 to 80 weight percent of the styrene with 60 to 20 weight percent of the isoolefin at temperatures between about −60° C. and −160° C. using a gaseous or liquid Friedel-Crafts catalyst such as boron fluoride, or aluminum chloride or bromide, or a hydroxy derivative thereof. Where the catalyst is not naturally gaseous or liquid, it is usually necessary to prepare the catalyst in the form of a solution of 0.8 percent to 5 percent concentration, suitable solvents being the mono- or polyhalogenated alkanes of 1 to 3 carbon atoms which are unreactive and liquid at the polymerization temperature, e. g., methyl bromide, methyl chloride, ethyl chloride, propyl chloride, or the low boiling fluorinated alkanes or alkenes such as dichlorodifluoromethane, dichloromonofluoromethane, trichloromonofluoromethane, dichlorotetrafluoroethane and the like. Alternatively, carbon disulfide can also be used. Further, with catalysts having suitable solvent characteristics, such as aluminum bromide, even the low boiling paraffinic hydrocarbons of 2 to 6 carbon atoms such as ethane, the various butanes or even hexane are useful for preparing the catalyst solution.

In preparing these thermoplastic copolymers, it is usually desirable to dilute the reactive monomers of the polymerization mixture with about 2 to 5 volumes of an inert diluent per volume of reactive feed. The diluent may be the same as the aforementioned catalyst solvent, or it may be liquid ethane, ethylene, propane, propylene, or the like. The polymerization mixture is cooled either internally, by allowing the liquid diluent such as ethylene to evaporate from the reaction at a suitable controlled rate, or externally by removing the heat from the polymerization mixture by means of a cooling jacket surrounding the polymerization reactor. The catalyst is added to the cold polymerization mixture in the form of a fine spray or jet. The general technique of preparing this general type of styrene copolymer is well-known and broadly described, for example, in U. S. Patent 2,274,749 of W. H. Smyers. However, for the purposes of the present invention only a certain well-defined type of copolymer prepared substantially in accordance with the procedure given hereinabove is useful. In particular, the present invention requires that the copolymer, be tough, flexible, thermoplastic, contain 40 to 80 percent, or preferably 50 to 70 percent of combined styrene, and have an intrinsic viscosity of at least about 0.6 to 1.5 or preferably 0.7 to 1.0, a Shore hardness between 35 and 95, Williams plasticity recovery between 90–6 and 400–20, tensile strength 900 to 4000 pounds per square inch, ultimate elongation between 200 and 1000 percent, and a softening point between 40 and 100° C., preferably between 60 and 80° C. This required type of copolymer is prepared at polymerization temperatures below −70° C., preferably between −80° C. and −120° C. For the sake of brevity, the thermoplastic copolymers having the properties just described will be hereinafter referred to simply as tough thermoplastic "styrene copolymers," which expression is therefore used in a highly restricted sense.

The following specific examples will serve to illustrate the unexpected advantages of the present invention.

EXAMPLE I

In this and all following illustrative examples, unless otherwise specified, the novel blends were prepared by first breaking down the diene-nitrile polymer on differential rolls at 40° C. (four passes) and then milling in the liquid or solid phenolic resins and thermoplastic styrene copolymers on a rubber mill at 55° C. over a period of 15 minutes. Milling temperatures between 45° C. and 65° C. are generally desirable in dealing with the thermosetting aldehyde resins, since these tend to cure or "scorch" at temperatures higher than about 80° C. The blended stocks were then cured for 15 minutes at 163° C. in a standard ASTM four-cavity mold (D–15–41) yielding slabs 6″ x 6″ x 0.075″. Test specimens were cut from the resulting rubbery or leathery stocks and when tested gave the following results:

*Table I*

|  | I | II |
|---|---|---|
|  | Parts | Parts |
| Perbunan-35 [1] | 100 | 100 |
| Zinc Oxide | 5 | 5 |
| Sulfur | 1.5 | 1.5 |
| Stearic Acid | 1.5 | 1.5 |
| Benzothiazyl Disulfide | 1.5 | 1.5 |
| Modified Phenolic Resin [2] | 50 | 50 |
| Styrene Copolymer [3] | 0 | 20 |

[1] Rubbery Copolymer of 63% Butadiene-37% Acrylonitrile; Mooney Viscosity 90.
[2] Thermosetting Condensation Product of the Formaldehyde-Isobutyl Phenol Type (Durez 13355).
[3] Thermoplastic Styrene-Isobutylene Copolymer Containing about 50% of combined styrene; intrinsic viscosity 0.7–0.8; softening point 55–65° C.

PROPERTIES OF BLENDS CURED FOR 15 MINUTES AT 163° C.

|  | I | | | II | | |
|---|---|---|---|---|---|---|
|  | H | T | E | H | T | E |
| Original | 59 | 2,780 light brown | 640 | 58 | 2,720 very light brown | 650 |
| Ultraviolet Light Aged for 150 hours at 125° F | 70 | 2,330 dark brown | 390 | 71 | 2,410 dark brown | 500 |
| Specific Gravity |  | 1.090 |  |  | 1.020 |  |
| Crescent Tear Resistance, lb./in |  | 340 |  |  | 410 |  |
| Brittle Temperature, °F |  | −10 |  |  | −10 |  |

NOTE.—The following abbreviations are used in all tables: B, Brittle Temperature, °F.; E, Ultimate Elongation, Percent; H, Durometer Hardness; M1, Modulus at 100% Elongation, p. s. i.; M2, Modulus at 200% Elongation, p. s. i.; T, Tensile Strength, p. s. i.
All proportions of materials given in this entire specification and claims are expressed in weight units unless otherwise specified.

From the data of Table I, it can be seen that the presence of the copolymer of styrene and isobutylene in the novel three-component blends also containing a phenolic resin and a diene-nitrile elastomer significantly improves the tear resistance and aging resistance as compared with two-component blends to which no styrene copolymer had been added. Moreover, the presence of the styrene copolymer in the blend favorably affects its processing characteristics and, most unexpectedly, it permits the easy removal of the compounds from the hot molds immediately upon completion of the molding operation, i. e., even at temperatures well above 100° C., whereas compounds not containing any styrene copolymer could not be removed without serious damage to the product unless the molds and contents were first cooled to temperatures below about 65° C., and preferably to room temperature. This improvement in molding characteristics is of the greatest practical importance since it allows a virtually continuous productive use of all molding equipment and eliminates the cooling step so wasteful of both thermal energy and time.

It is not known exactly what property of the styrene copolymers is primarily responsible for this surprising and unique improvement in mold behavior but it is surmised that actually a combination of properties is involved. In particular, it appears that the thermoplastic styrene copolymer acts in part like a wax and lubricates the compound so as to prevent its sticking to the mold. However, unlike wax, the great binding strength and toughness of the copolymer even in the hot state imparts an unequaled cohesiveness to the hot compound which allows its handling even at high temperatures without causing serious deformation or disintegration of the molded product. The difference between the styrene copolymers and wax is clearly apparent from the following table showing Williams Plasticity-Recovery figures and Mooney viscosity figures at elevated temperatures for two types of commercial styrene-isobutylene copolymers, one containing about 50 percent combined styrene and the other one 60 percent combined styrene.

| | Styrene-Isobutylene Copolymer (50% Styrene Content) | Styrene-Isobutylene Copolymer (60% Styrene Content) |
|---|---|---|
| Williams Plasticity-Recovery at— | | |
| 40° C | 398— 8 | 404— 0 |
| 60° C | 240—26 | 308—12 |
| 80° C | 130— 2 | 150— 8 |
| 100° C | 80— 0 | 80— 0 |
| 120° C | 75— 0 | 75— 0 |
| 140° C | 60— 0 | 60— 0 |
| 150° C | 40— 0 | 40— 0 |
| Mooney Viscosity (1.5 and 8 Minutes Respectively) at— | | |
| 105° C | 38—37 | 45—44 |
| 120° C | 33—31 | 31—30 |
| 135° C | 19—18 | 20—18 |
| 150° C | 14—10 | 11— 8 |

Whereas it is known that wax becomes a mobile liquid at temperatures between about 40 and 65° C., the above results show that the thermoplastic styrene copolymers retain considerable toughness or cohesiveness at temperatures even as high as 150° C., i. e., in the temperature range employed for curing the novel compositions. The cohesiveness is particularly clearly indicated by the Mooney viscosity figures which show only a slight decrease for the 8-minute values as compared to the 1.5 minute values, indicating that the viscosity or plasticity rapidly reaches an equilibrium value and thereafter remains substantially constant.

Moreover, the inherent strength and toughness of the styrene copolymer makes it possible to use relatively large percentages thereof, e. g., 15 or even 40 percent based on the combined weight of the aldehyde resin and the diene-nitrile elastomer whereas mold lubricants of the prior art, such as wax, high molecular weight polyisobutylene or heavy metal soaps could not be used in amounts exceeding about two percent as otherwise a serious reduction in tensile strength of the molded compound would result, in some instances primarily because of immiscibility, and in other instances because of the inherent weakness of the prior art "lubricants" or extenders. Also as indicated earlier, even if reasonably satisfactory mold lubrication was achieved by the prior art lubricants, it remained impossible to remove the molded compound from the mold without cooling because in the absence of the styrene copolymers the related prior art compounds were exceedingly weak and/or tacky when hot.

In addition to the advantages described above, still other highly beneficial effects are attributable to the styrene copolymer when present in the blend in an amount equal to at least 5 percent, preferably 10 to 40 percent, based on the combined weight of aldehyde resin and diene-nitrile elastomer. When used in these proportions the styrene copolymer improves the mill behavior as well as other processing characteristics of the blends and greatly broadens their latitude for compounding and increases their tolerance, both in regard to amount and in regard to type of filler, thereby allowing the formulation of relatively inexpensive compounds possessed of excellent properties, notably impact resistance and solvent resistance. Furthermore, the presence of the styrene copolymer in the specified amounts is responsible for substantially eliminating shrinkage on molding so that the invention is directly instrumental in allowing the molding of aldehyde resin compounds very close to tolerance, thus minimizing waste of materials as well as labor. Moreover, by increasing the styrene copolymer content of the blends it is possible to improve the softening point and solubility of the latter when desired.

Conversely, by increasing the phenol-aldehyde resin concentration of the blends within the limits specified below, more nearly rigid, harder, oil resistant products of increased melting point can be obtained which are characterized by excellent impact and tensile strength due to the presence of the other polymers.

Still another advantage inherent in the presence of the phenol-aldehyde resin in the novel blends is that these blends can be used directly for the manufacture of various products without any need for further compounding ingredients such as fillers or plasticizers. Indeed even sulfur and other vulcanization agents for the diene-nitrile elastomer may be omitted altogether since the phenol-aldehyde resin reacts with the elastomer when heated and thus brings about a satisfactory cure of the blend.

On the other hand, by increasing the diene-nitrile elastomer concentration in the blends within the limits given subsequently, flexibility and elastic extensibility of the product can be modified without any substantial sacrifice of the desirable properties attributable to the other two principal ingredients of the novel blends. Alternatively, where extensibility and superior oil resistance are not of prime importance, two-component blends of excellent impact strength and other desirable properties can be prepared from phenol-formaldehyde resins and styrene copolymers, omitting the diene-nitrile elastomer from the blend completely.

EXAMPLE II

The results shown in Table II are illustrative of the advantageous properties of the novel three-component blends in compounds loaded with fillers.

As in Example I, those novel compounds shown in Table II which contained the styrene copolymer again exhibited superior processing properties, aging resistance and were unexpectedly suitable for immediate removal from hot molds. Moreover, while the other tested plasticizers caused a noticeable decrease in tear resistance, the styrene copolymer actually brought about a very substantial increase in tear resistance of the final compound. Also while the other plasticizers brought about a reduction in hardness and modulus along with the required improvement of processing characteristics, the styrene copolymer appears to be outstanding as a plasticizer in that it actually improves the processing characteristics The compounds described in Table III were prepared from the same base recipe as in Example II and cured under the same conditions, except that an elastomer containing only about 26

Table II

BASE RECIPE

| | Parts |
|---|---|
| Perbunan-35 (Mooney 90) | 100 |
| Zinc oxide | 5 |
| Stearic acid | 1 |
| N-cyclohexyl-2-benzothiazole sulfenamide | 1 |
| Sulfur | 1.5 |
| Technical calcium carbonate with about 2% tall oil | 30 |
| Hydrated precipitated calcium silicate | 50 |
| Calcium oxide | 3 |
| Resin, as shown below | |
| Plasticizer, as shown below | |

| | A | B | C | D | E | F |
|---|---|---|---|---|---|---|
| Modified Phenolic (Monsanto 378) | 35 | | 35 | 35 | 35 | |
| Modified Phenolic (Cardolite 904) | | 35 | | | | 35 |
| Polymer of Indene, Coumarone, etc. (Cumar P-25) | | | 15 | | | |
| Dibutyl Phthalate | | | | 15 | | |
| Styrene Copolymer (As in Table I) | | | | | 15 | 15 |

| | H | T | E | M1 | H | T | E | M1 | H | T | E | M1 | H | T | E | M1 | H | T | E | M1 | H | T | E | M1 |
|---|---|---|---|---|---|---|---|---|---|---|---|---|---|---|---|---|---|---|---|---|---|---|---|---|
| Original | 80 | 1850 | 360 | 540 | 80 | 1810 | 500 | 560 | 66 | 1930 | 490 | 370 | 78 | 1200 | 360 | 450 | 89 | 1910 | 410 | 680 | 85 | 1570 | 530 | 550 |
| Specific Gravity | | 1.389 | | | | 1.361 | | | | 1.363 | | | | 1.378 | | | | 1.322 | | | | 1.309 | | |
| Crescent Tear Resistance, Lb./In. | | 330 | | | | 330 | | | | 320 | | | | 280 | | | | 380 | | | | 360 | | |
| Brittle Temperature, °F | | −10 | | | | −10 | | | | 0 | | | | −30 | | | | −10 | | | | −10 | | | and at the same time increases the hardness and particularly the modulus of the final product. This increase in modulus is of the greatest importance where products possessing high degree of flexibility are desired, since it is well known that good flexibility is a function of the modulus, high modulus apparently reducing the amount of internal heat build-up and thus leading to more truly reversible elasticity.

It is also to be noted that in addition to the advantages previously stated, the styrene copolymers are unusually advantageous in that they lead to the formation of relatively light-colored products which can be fairly readily used in the production of most pastel and even white colors, thereby opening a substantially new field for phenolic plastics, whereas similar prior art resin compounds could not be pigmented sufficiently to obtain this desirable result.

EXAMPLE III

The final properties of the novel compounds can also be varied by selecting a diene-nitrile elastomer of a particular nitrile content. This is illustrated by comparing the results of this example with those of Example II.

to 28 percent of combined acrylonitrile was substituted for the elastomer used in Example II which contained about 35 to 37 percent of combined acrylonitrile.

Table III

[Base recipe same as Table II.]

| | A | B | C | D | E | F |
|---|---|---|---|---|---|---|
| Modified Phenolic (Monsanto 378) | 35 | | 35 | 35 | 35 | |
| Modified Phenolic (Cardolite 904) | | 35 | | | | 35 |
| Polymer of Indene, Coumarone, etc. (Cumar P-25) | | | 15 | | | |
| Dibutyl Phthalate | | | | 15 | | |
| Styrene Copolymer (As in Table I) | | | | | 15 | 15 |

| | H | T | E | M1 | H | T | E | M1 | H | T | E | M1 | H | T | E | M1 | H | T | E | M1 | H | T | E | M1 |
|---|---|---|---|---|---|---|---|---|---|---|---|---|---|---|---|---|---|---|---|---|---|---|---|---|
| Original | 73 | 1770 | 460 | 290 | 72 | 1440 | 600 | 440 | 70 | 1060 | 440 | 360 | 60 | 1410 | 570 | 180 | 73 | 1550 | 550 | 250 | 77 | 1250 | 640 | 370 |
| Specific Gravity | | 1.343 | | | | 1.352 | | | | 1.343 | | | | 1.349 | | | | 1.298 | | | | 1.290 | | |
| Crescent Tear Resistance, Lb./In. | | 260 | | | | 270 | | | | 270 | | | | 250 | | | | 300 | | | | 340 | | |
| Brittle Temperature, °F | | −30 | | | | −30 | | | | −30 | | | | −40 | | | | −30 | | | | −20 | | |

The results summarized in Table III again illustrate the advantageous effect of the styrene copolymer on processing characteristics and tear resistance. The styrene copolymer was again responsible for allowing unusually easy removal of the molded products from hot molds. Likewise, the characteristic increase in tear resistance, hardness and modulus was observed in comparison with blends containing conventional plasticizers.

Moreover, by comparing the results of this example with those of Example II, it can be seen that by using an elastomer of lower nitrile content, products having a favorably lower brittle temperature can be obtained. In addition, the products of Example III have been found to be more extensible and more resistant to polar solvents such as ketones, though of somewhat lower tensile strength and modulus. Conversely, these results show that where high resistance to hydrocarbon solvents as well as maximum tear and tensile strength are the primary desiderata, the high nitrile copolymer of Example II is to be preferred in formulating the novel blends.

EXAMPLE IV

Interesting properties illustrated in subjoined Table IV can also be obtained by curing the novel three-component blends in the absence of sulfur and other conventional rubber vulcanizing aids.

Table IV

|  | Compound 1 | Compound 2 | Compound 3 |
|---|---|---|---|
| Modified Phenolic Resin [1] | 150 | 150 | 150 |
| Butadiene-Acrylonitrile Rubber [2] | 100 | 50 | 50 |
| Styrene-Isobutylene Copolymer (50% Styrene content) | | 50 | |
| Styrene-Isobutylene Copolymer (60% Styrene content) | | | 50 |
| *Cure 30 Minutes at 325° F.* | | | |
| Tensile Strength, #/in.$^2$ | 5,600 | 5,600 | 6,000 |
| Elongation, per cent | 40 | 40 | 40 |
| Shore Hardness | 90 | 92 | 98 |
| A. S. T. M. Brittleness, °F | +20 | 0 | 0 |
| Tear Resistance | 840 | 860 | 900 |

[1] Monsanto 378 (condensation product of isobutyl phenol and formaldehyde).
[2] 37% combined acrylonitrile; Mooney viscosity 90.

A comparison of compounds 2 and 3 in the above table with the two-component control compound 1 shows that a large proportion of the rubbery component of the blend can be replaced by the styrene copolymer in accordance with the present invention in order to improve the processing characteristics of the blend without adversely affecting the properties of the finished product. In fact the results disclose that the styrene copolymers improve noticeably the low temperature brittleness of the blends as well as their tear resistance and hardness. Furthermore the addition of the copolymer consisting of 60% combined styrene quite significantly improves the tensile strength of the cured blend as illustrated by compound 3. Moreover, the results show clearly that a satisfactory cure can be obtained by the reaction of the phenolic resin with the rubbery polymer in the absence of added vulcanization agents for the rubbery constituent.

EXAMPLE V

By increasing the proportion of the phenolic resin in the blends useful molding compounds of a more or less rigid type can be obtained as shown in Table V.

Table V

|  | Compound 1 | Compound 2 | Compound 3 |
|---|---|---|---|
| Modified Phenolic Resin [1] | 100 | 100 | 100 |
| Butadiene-Acrylonitrile Rubber [2] | | 15 | 15 |
| Styrene-Isobutylene Copolymer (50% styrene content) | | 15 | |
| Styrene-Isobutylene Copolymer (60% styrene content) | | | 15 |
| Woodflour | 100 | 70 | 70 |
| *Cure 60 Minutes at 300° F.* | | | |
| Rockwell Hardness | M-69 | M-56 | M-61 |
| Tensile Strength #/in.$^2$ | 2700 | 3200 | 3800 |
| Compression Yield (Deflection at Ultimate Break Per Cent) | Very Slight | 4.2 | 4.1 |
| Ultimate Compression Strength, #/in.$^2$ | 6,120 | 9,200 | 9,000 |
| Flexural Strength, #/in.$^2$ | 4,100 | 5,110 | 4,900 |
| Impact Strength (Izod) Ft. Lb./In. of Notch | 0.08 | 0.61 | 0.56 |
| Heat of Distortion, °C | 128 | 121 | 122 |

[1] Monsanto 378 (condensation product of isobutyl phenol and formaldehyde).
[2] 37% combined acrylonitrile; Mooney viscosity 90.

The results of the above table show that compounds 2 and 3 prepared in accordance with the present invention are possessed of many superior properties as compared with the polymer-free phenolic control compound 1. In addition to the processing advantages described in earlier parts of this application, the novel blends described above showed negligible shrinkage on molding, and further showed an improvement in tensile strength, compression strength, compression yield, and flexural strength. However, the most unexpected advantage is the large improvement in impact strength from 0.08 ft. lbs./in. to about 0.6 ft. lbs./in., an improvement of about 700 percent. At the same time it is to be noted that the presence of substantial quantities of the thermoplastic styrene copolymer had a surprisingly small effect on the heat of distortion of the resulting blend.

While the examples disclose blends containing the three primary components in only a limited number of proportions, depending upon the ultimate properties desired the ratio of phenolic resin to diene-nitrile elastomer may be varied at will in the blends within the limits of 30/100 to 100/15 and the concentration of styrene copolymer may be varied in the blends within the limits of 5 to 40 weight percent based on the combined weight of resin and elastomer.

Also, while only a limited number of curing and compounding ingredients has been used in the examples, other similar known ingredients may be used. For example, the rubber curing agents may be any of the known materials used for this purpose, e. g., 0.5 or 1 to 5 weight percent of sulfur, 0.2 to 3 weight percent of organic vulcanization accelerators such as benzothiazyl disulfide, tetramethyl thiuram disulfide, N-cyclohexyl-2-benzothiazole sulfenamide, diphenyl guanidine, zinc diethyl dithiocarbamate, etc.

The usual auxiliary compounding and curing aids, anti-oxidants, fillers, pigments, and dyes may also be present. For example, higher fatty acids, such as stearic or oleic acid may be present in amounts ranging from 0.5 to 5 percent based on the total blend; 0.5 to 60 percent or preferably one to 5 percent of basic metal oxide in the form of zinc oxide, lead oxide, magnesia, basic lead oxide, basic lead carbonate, lead silicate, and hydrated lime; anti-oxidants of the amine type such as phenyl-beta-naphthylamine or of the phenol type such as diisobutyl cresol; carbon black, mica, talc, barytes, clay, asbestos, lithopone, cotton and wood fibres, woodflour, etc., may likewise be used in conjunction with the blends of the present invention.

An important advantage of the invention is that due to the presence of the styrene copolymers no further auxiliary plasticizers such as alkyl phthalates, phosphates or other ester-type or low molecular weight substances are usually required. Thus, the reduction in tensile strength generally coincident with the use of the common prior art plasticizers which have no inherent strength is entirely avoided as is the problem of avoiding the leaching out of the plasticizer from the finished product on contact with various solvents. Of course, if the incorporation of the common ester-type or similar auxiliary plasticizers in the blends of the invention is desired for any particular reason, such incorporation is feasible though not recommended because of the aforementioned disadvantages incident thereto.

The blended compounds are usually cured in molds at temperatures between 90 and 180° C.

for periods ranging from 2 minutes to 60 minutes, or preferably for 10 to 20 minutes at 150 to 165° C.

The novel blends contain a diene-nitrile copolymer and a styrene-monoolefin copolymer; and a phenolic resin wherein the phenol is preferably monoalkylated with an olefin of up to about 18 carbon atoms such as isobutylene, diisobutylene or triisobutylene, a $C_{12}$ polypropylene or with the $C_{11}$ to $C_{18}$ olefins obtained from the Fischer-Tropsch process, or the phenol may be of the unsaturated type obtained from cashew nut shell oil; the novel blends are characterized by favorable mixing characteristics, excellent impact strength, tensile strength, resistance to hydrocarbon solvents, improved aging properties, tear strength, elongation and light color. Moreover, the blends have the unusual property of being adapted for removal from hot molds immediately upon completion of the molding operation, thereby offering a valuable advantage from the point of view of production economy. Furthermore, the products prepared in accordance with the present invention may be easily press polished to give very high gloss.

The foregoing properties of the novel rubbery or leather-like products make them exceptionally well suited for shoe sole material, decorative leather substitutes, upholstery, gaskets, and the more rigid blends may be used for electrical plugs and other accessories, for radio cabinets, molded furniture, grease-resistant tableware or food trays and the like. Furthermore, the solubility of the novel compounds in polar solvents such as methyl ethyl ketone or cyclohexanone allows them to be applied from solutions in the form of films, e. g., as a protective adherent undercoating for automobiles, or as a temporary protective coating to be applied to machinery such as airplanes prior to storage or shipment. When properly formulated such protective coatings can be easily stripped when no longer needed. Alternatively, instead of preparing the protective films from solution, due to the presence of the styrene copolymer excellent self-supporting films can be calendered from the resinous blends of the invention and these films can then be used as protective wrappings.

While the foregoing description and specific examples illustrate some of the unobvious advantages of the present invention, it must be understood that many variations or modifications thereof can be made without departing from the scope of the present invention.

We claim:

1. A composition of matter comprising a rubber-like copolymer of 60 to 80 percent of a conjugated diolefin of 4 to 6 carbon atoms and 40 to 20 percent of an acrylic nitrile having the general formula $H_2C=CR-CN$ wherein R is selected from the group consisting of hydrogen, chlorine, methyl and ethyl; a thermosetting condensation resinoid of a phenol of 6 to 25 carbon atoms and an aldehyde of 1 to 7 carbon atoms; and a copolymer of 40 to 80 percent of a styrene having the general formula

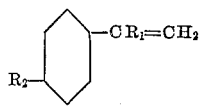

wherein $R_2$ is selected from the group consisting of hydrogen and methyl and wherein $R_1$ is selected from the group consisting of hydrogen and methyl when $R_2$ is hydrogen and $R_1$ is hydrogen when $R_2$ is methyl and 60 to 20 percent of an isomonoolefin having 4 to 5 carbon atoms, the last said copolymer being characterized by an intrinsic viscosity between 0.6 and 1.0, a softening point between 40 and 80° C. and a tensile strength between 900 and 4000 pounds per square inch; the weight ratio of thermosetting resinoid to diolefin-nitrile copolymer being between 30/100 and 100/15 and the concentration of styrene copolymer in the total composition being between 5 and 40 weight percent based on the combined weight of resinoid and diolefin-nitrile copolymer.

2. A leather-like composition of matter comprising 100 parts of an elastomer of 60 to 80 percent of butadiene-1,3 copolymerized with 40 to 20 percent of acrylonitrile, said elastomer having a Mooney viscosity between 60 and 100; 30 to 100 parts of a thermosetting phenol-formaldehyde condensation resinoid; and 5 to 50 parts of a solid, semi-elastic copolymer of 50 to 80 percent of styrene and 50 to 20 percent of isobutylene, said copolymer having an intrinsic viscosity between 0.7 and 1.0, Mooney viscosity of at least 30 at 100° C., and a tensile strength between 1200 and 3000 pounds per square inch.

3. A cured composition of matter characterized by a crescent tear resistance of 350 to 450 pounds per inch and comprising 100 parts of an elastomer of 60 to 80 percent of butadiene-1,3 copolymerized with 40 to 20 percent of acrylonitrile, said elastomer having a Mooney viscosity between 60 and 100; 30 to 100 parts of a thermosetting condensation resinoid of an alkylated phenol and formaldehyde; 5 to 50 parts by weight of a rubber-like copolymer of 50 to 70 percent of a styrene and 50 to 30 percent of isobutylene, said copolymer having an intrinsic viscosity between 0.7 and 1.0, softening point between 50 and 75° C. and a tensile strength between 1200 and 3000 pounds per square inch; and 0.5 to 5 parts by weight of a vulcanization agent.

4. A cured leather-like composition comprising 100 parts of an elastomer of 65 percent of butadiene-1,3 copolymerized with 35 percent of acrylonitrile, said elastomer having a Mooney viscosity between 60 and 100; 35 parts of a thermosetting isobutyl phenol-formaldehyde condensation resinoid; 15 parts of a solid, semi-elastic copolymer of 50 percent styrene and 50 percent isobutylene, said copolymer having an intrinsic viscosity of 0.7 to 0.8; 5 parts of zinc oxide; 1 part of stearic acid; 1 part of n-cyclohexyl-2-benzothiazole sulfenamide; 1.5 parts of sulfur and 30 to 90 parts of inorganic filler; the cured composition being characterized by a crescent tear strength of at least 350 pounds per inch, a tensile strength between 1500 and 2000 pounds per square inch and an elongation between 400 and 600 percent.

5. A heat-cured, sulfur-free composition of matter comprising a major proportion of a thermosetting phenol-aldehyde resin, a minor proportion of a rubbery copolymer of 60 to 80% of butadiene and 40 to 20% of acrylonitrile, and a minor proportion of a thermoplastic copolymer of 40 to 70 percent styrene and 60 to 30 percent isobutylene having an intrinsic viscosity of 0.6 to 1.5.

6. A composition adapted for molding rigid articles to close tolerance comprising a major proportion of a thermosetting phenol-aldehyde resin, a minor proportion of a rubbery copolymer of 60 to 80% butadiene and 40 to 20% of acrylonitrile, a minor proportion of a thermoplastic styrene-isobutylene copolymer having a combined styrene content of 40 to 70 percent and an intrinsic viscosity of 0.7 to 1.0, and a minor proportion of woodflour.

7. A method comprising mixing at a temperature between 120° F. and 140° F., 100 parts of a copolymeric elastomer of 60 to 80 percent of a conjugated diolefin of 4 to 6 carbon atoms and 40 to 20 percent of acrylonitrile, said elastomer having a Mooney viscosity between 60 and 100; 30 to 100 parts of a thermosetting alkyl phenol-formaldehyde condensation resinoid; and 5 to 50 parts of a solid, semi-elastic copolymer of 40 to 70 percent of styrene and 50 to 30 percent of isobutylene, said copolymer having an intrinsic viscosity of 0.6 to 1.0.

8. A method comprising mold-curing, at a temperature between 300 and 350° F., a compound comprising 100 parts of an elastomer of 60 to 80 percent of butadiene-1,3 copolymerized with 40 to 20 percent of acrylonitrile; said elastomer having a Mooney viscosity between 60 and 100; 30 to 100 parts of a thermosetting alkylated phenol-formaldehyde condensation resinoid; 5 to 50 parts of a solid, semi-elastic copolymer of 50 to 70 percent of styrene and 50 to 30 percent of isobutylene, said copolymer having an intrinsic viscosity of 0.7 to 1.0; and 0.5 to 5 parts of sulfur; and removing the cured compound from the curing zone at a temperature above 250° F.

RAYMOND G. NEWBERG.
DAVID W. YOUNG.

REFERENCES CITED

The following references are of record in the file of this patent:

UNITED STATES PATENTS

| Number | Name | Date |
|---|---|---|
| 2,213,423 | Wiezevich | Sept. 3, 1940 |
| 2,325,981 | Sarbach | Aug. 3, 1943 |
| 2,459,739 | Groten et al. | Jan. 18, 1949 |

OTHER REFERENCES

Carswell, pp. 9–12, 29–31, "Phenoplasts," pub. 1947 by Interscience Pub., Inc., N. Y.

Shepard et al.: Modern Plastics, Oct. 1946, pp. 154–156, 210 and 211.

Newberg et al.: Rubber Age, Feb. 1948, pp. 533–539.